US012687724B2

(12) United States Patent
Lentes et al.

(10) Patent No.: US 12,687,724 B2
(45) Date of Patent: Jul. 21, 2026

(54) WAVEGUIDE AND AUGMENTED/MIXED REALITY DEVICE

(71) Applicant: Schott AG, Mainz (DE)

(72) Inventors: Frank-Thomas Lentes, Bingen (DE); Clemens Ottermann, Hattersheim (DE); Stefan Weidlich, Mainz (DE)

(73) Assignee: SCHOTT AG, Mainz (DE)

( * ) Notice: Subject to any disclaimer, the term of this patent is extended or adjusted under 35 U.S.C. 154(b) by 292 days.

(21) Appl. No.: 18/470,069

(22) Filed: Sep. 19, 2023

(65) Prior Publication Data

US 2024/0094543 A1     Mar. 21, 2024

(30) Foreign Application Priority Data

Sep. 20, 2022    (DE) ...................... 10 2022 124 071.1

(51) Int. Cl.
*G02B 27/01* (2006.01)

(52) U.S. Cl.
CPC .... *G02B 27/0172* (2013.01); *G02B 2027/011* (2013.01)

(58) Field of Classification Search
CPC ................................................ G02B 2027/011
See application file for complete search history.

(56) References Cited

U.S. PATENT DOCUMENTS

| | | |
|---|---|---|
| 11,474,347 B2 | 10/2022 | Erler et al. |
| 2017/0059879 A1* | 3/2017 | Vallius ............... G02B 27/4205 |
| 2021/0199873 A1 | 7/2021 | Shi et al. |

OTHER PUBLICATIONS

"Optical Constants of BK7", URL: https://refractiveindex.info/?shefl=glass&book=BK7&page=SCHOTT, retrieved May 19, 2023 (4 pages).
"DataSheet Schott N-BK7, Stand Feb. 1, 2014", URL: https://www.schott.com/shop/advanced-optics/de/Optisches-Glas/N-BK7/c/glass-N-BK7, retrieved May 19, 2023 (1 page).
German Office Action dated May 19, 2023 for German Patent Application No. 10 2022 124 071.1 (10 pages).

* cited by examiner

*Primary Examiner* — Sung H Pak
(74) *Attorney, Agent, or Firm* — TAYLOR & EDELSTEIN, PC

(57) ABSTRACT

A waveguide for guiding an image pixel light includes: a solid body including an optical material which is transparent for at least a light with a wavelength of 460 nm; an in-coupling surface located on the solid body; and an out-coupling surface located on the solid body, wherein the optical material has an absorption coefficient $\kappa$460 nm for light having a wavelength of 460 nm, a thermal conductivity k, a coefficient of thermal expansion $\alpha$20° C. at a temperature of 20° C., a refractive index nF related to the hydrogen F-line, and a derivative dnF/dT20° C. which are related in such a way that a thermally induced change of an optical path length within the waveguide due to an absorption of at least one of heat and an optical radiation is quantitatively described by a merit function.

20 Claims, 4 Drawing Sheets

WAVEGUIDE AND AUGMENTED/MIXED REALITY DEVICE

CROSS REFERENCE TO RELATED APPLICATIONS

This claims priority to German patent application no. 10 2022 124 071.1, filed Sep. 20, 2022, which is incorporated herein by reference.

BACKGROUND OF THE INVENTION

1. Field of the Invention

The present invention relates to augmented or mixed reality devices, and, more particularly, to waveguides.

2. Description of the Related Art

The invention relates to a waveguide for guiding image pixel light, optionally for augmented reality or mixed reality applications such as near-eye displays.

To create an augmented or mixed reality experience, a user typically uses a head-mounted device, for example in the form of glasses, which on the one hand allows the user to see through into the environment and on the other hand can insert additional elements into the user's field of vision to alter the experienced reality. Such additional elements may for example be hints about objects the user is looking at or precisely positioned additional objects in the environment or the like.

To this end, augmented or mixed reality devices typically include a waveguide for guiding image pixel light from an in-coupling surface at a first location on the waveguide to an out-coupling surface at a second location in the user's field of view. The light guidance from the in-coupling surface to the out-coupling surface is usually achieved by total reflection in the waveguide.

The in-coupling surface is usually comparatively small so that the waveguide may be locally heated by partial absorption of light intensity. As a result, an inhomogeneous temperature distribution can occur in the waveguide, which may not only be the case in the heating phase but may also persist in the stationary case of thermal equilibrium. Thermo-optical effects, which are caused thereby, may impair the image quality.

What is needed in the art is a waveguide for guiding image pixel light, an augmented reality or mixed reality device and/or appropriate optical materials to minimize thermo-optical effects, in particular taking into account the spectral ranges of respective image-generating light sources.

SUMMARY OF THE INVENTION

To this end, the present invention provide a waveguide for guiding image pixel light, optionally for augmented reality or mixed reality applications such as near-eye displays, including a solid body, an in-coupling surface for coupling the image pixel light into the solid body and an out-coupling surface for coupling the image pixel light out again from the solid body, wherein both the in-coupling and out-coupling surfaces are located on the solid body.

The solid body includes an optical material, which is transparent for at least light with a wavelength of 460 nm, optionally for the visible spectrum.

The optical material has an absorption coefficient $\kappa_{460nm}$ for light having a wavelength of 460 nm, a thermal conductivity k, a coefficient of thermal expansion $\alpha_{20°\ C.}$ at a temperature of 20° C., a refractive index $n_F$ related to the hydrogen F-line, and a derivative $dn_F/dT_{20°\ C.}$, wherein the derivative $dn_F/dT_{20°\ C.}$ characterizes the change of the refractive index with the temperature. The hydrogen F-line may be described as at 486 nm.

Optionally, the parameters $\kappa_{460nm}$, k, $\alpha_{20°\ C.}$, $n_F$, and $dn_F/dT_{20°\ C.}$ are related in such a way that a thermally induced change of the optical path length within the waveguide due to absorption of heat and/or optical radiation is quantitatively described by a merit function.

This has the advantage that thermo-optical effects which are caused by heat and/or optical radiation are controllable, for example in that different thermo-optical phenomena (i.e., effects) cancel each other out.

The geometry of the waveguide can be designed differently depending on the device or application in which it is used.

Optionally, however, the solid body defines a longitudinal axis and/or includes the solid body including two opposing surfaces, optionally oriented parallel to the longitudinal axis, wherein the two opposing surfaces may be configured for guiding the image pixel light along the longitudinal axis of the solid body by total reflection.

The in-coupling surface optionally is located on one of the two opposing surfaces of the solid body. Also, the out-coupling surface optionally is located on one of the two opposing surfaces. The in-coupling and out-coupling surfaces may be located on the same surface or on opposing surfaces.

In an embodiment of the present invention, the waveguide further includes a first optical diffractive structure being configured to redirect the image pixel light, wherein the first optical diffractive structure optionally is located on or in the solid body, optionally on one of the two opposing surfaces, optionally on or opposite to the in-coupling surface.

In an embodiment of the present invention, the waveguide includes a second optical diffractive structure, which is configured to redirect the image pixel light, wherein the second optical diffractive structure optionally is located on or in the solid body, more optionally on or opposite to the out-coupling surface.

The optical material may be characterized by a refractive index nd related to the helium d-line. The refractive index nd may be greater than 1.5, optionally greater than 1.6, optionally greater than 1.7, optimally greater than 1.8, optionally greater than 1.9, optionally greater than 2.0.

In an embodiment of the present invention, the optical material defines a function $F_{TO}=(\kappa_{460nm}/k)((1/n_F)(dn_F/dT_{20°\ C.})+\alpha_{20°\ C.})$ denoted as a thermo-optical function.

Optionally, the thermo-optical function $F_{TO}$ is less than 100/W, optionally less than 60/W, optionally less than 20/W, optionally less than 15/W.

In an embodiment of the present invention, the absorption coefficient $\kappa_{460nm}$ may be less than 10/m, optionally less than 5/m, optionally less than 3/m.

The absorption coefficient $\kappa_{460nm}$ may also be in the range of 0.01/m to 10/m, optionally in the range of 0.01/m to 5/m, optionally in the range of 0.01/m to 3/m.

In an embodiment of the present invention, the thermal conductivity k is in the range of 0.5 W/(m·K) to 1.5 W/(m·K), optionally in the range of 0.8 W/(m·K) to 2W/(m·K).

In an embodiment of the present invention, the coefficient of thermal expansion $\alpha_{20°\ C.}$ is in the range of $0.5 \cdot 10^{-6}$/K to $15 \cdot 10^{-6}$/K, optionally in the range of $2 \cdot 10^{-6}$/K to $10 \cdot 10^{-6}$/K, optionally in the range of $3 \cdot 10^{-6}$/K to $10 \cdot 10^{-6}$/K.

In an embodiment of the present invention, the derivative $dn_F/dT_{20° C.}$ is in the range of $-1 \cdot 10^{-6}/K$ to $+9 \cdot 10^{-6}/K$, optionally in the range of $-5 \cdot 10^{-6}/K$ to $7 \cdot 10^{-6}/K$, optionally in the range of $-5 \cdot 10^{-6}/K$ to $7 \cdot 10^{-6}/K$.

The optical material of the solid body of the waveguide may optionally be optically isotropic.

The optical material generally may be selected from the group consisting of glass, polymer, optoceramics, crystalline material, wherein optionally the optical material is a glass or a polymer, optionally a glass.

In some embodiments, the optical material may include cyclo olefin copolymer (COC), polycarbonate (PC), and/or polymethyl methacrylate (PMMA).

The present invention further relates to an augmented or mixed reality device, optionally near-eye display, including a waveguide as described above or use of a waveguide as described above, in an augmented or mixed reality device, optionally in a near-eye display.

Such augmented or mixed reality device optionally further includes an image light source for delivery of image pixel light for coupling into the solid body of the waveguide.

The image light source optionally is configured to deliver image pixel light with an intensity in the range of 0.01 $W/cm^2$ to 10 $W/m^2$.

The augmented or mixed reality device or the use may be configured such that during delivery of image pixel light which is coupled into the waveguide, a temperature gradient |grad T| is obtained in the solid body, in particular in the direction along the longitudinal axis of the solid body, wherein |grad T| is in the range of 1 K/cm to 10 K/cm.

The present invention further relates to an optical material, optionally for a waveguide or an augmented or mixed reality device as described above.

The optical material has an absorption coefficient $\kappa_{460nm}$ for light having a wavelength of 460 nm, a thermal conductivity k, a coefficient of thermal expansion $\alpha_{20° C.}$ at a temperature of 20° C., a refractive index $n_F$ related to the sodium F-line, and a derivative $dn_F/dT_{20° C.}$.

The parameters $\kappa_{460nm}$, k, $\alpha_{20° C.}$, $n_F$, and $dn_F/dT_{20° C.}$ are related in such a way that a thermally induced change of an optical path length within the waveguide due to absorption of heat and/or optical radiation is quantitatively described by a merit function.

The optical material may be characterized by a refractive index nd related to the helium d-line. The refractive index nd may be greater than 1.5, optionally greater than 1.6, optionally greater than 1.7, optimally greater than 1.8, optionally greater than 1.9, optionally greater than 2.0.

In an embodiment of the present invention, the optical material defines a function $F_{TO}=(\kappa_{460nm}/k)((1/n_F)(dn_F/dT_{20° C.})+\alpha_{20° C.})$ denoted as thermo-optical function.

Optionally, the thermo-optical function $F_{TO}$ is less than 100/W, optionally less than 60/W, optionally less than 20/W, optionally less than 15/W.

In an embodiment of the present invention, the absorption coefficient $\kappa_{460nm}$ may be less than 10/m, optionally less than 5/m, optionally less than 3/m.

The absorption coefficient $\kappa_{460nm}$ may also be in the range of 0.01/m to 10/m, optionally in the range of 0.01/m to 5/m, optionally in the range of 0.01/m to 3/m.

In an embodiment of the present invention, the thermal conductivity k is in the range of 0.5 W/(m·K) to 1.5 W/(m·K), optionally in the range of 0.8 W/(m·K) to 2 W/(m·K).

In an embodiment of the present invention, the coefficient of thermal expansion $\alpha_{20° C.}$ is in the range of $0.5 \cdot 10^{-6}/K$ to $15 \cdot 10^{-6}/K$, optionally in the range of $2 \cdot 10^{-6}/K$ to $10 \cdot 10^{-6}/K$, optionally in the range of $3 \cdot 10^{-6}/K$ to $10 \cdot 10^{-6}/K$.

In an embodiment of the present invention, the derivative $dn_F/dT_{20° C.}$ is in the range of $-1 \cdot 10^{-6}/K$ to $+9 \cdot 10^{-6}/K$, optionally in the range of $-5 \cdot 10^{-6}/K$ to $7 \cdot 10^{-6}/K$, optionally in the range of $-5 \cdot 10^{-6}/K$ to $7 \cdot 10^{-6}/K$.

The optical material of the solid body of the waveguide may optionally be optically isotropic.

The optical material generally may be selected from the group consisting of glass, polymer, optoceramics, crystalline material, wherein optionally the optical material is a glass or a polymer, particularly optionally a glass.

In some embodiments, the topical material may include cyclo olefin copolymer (COC), polycarbonate (PC), and/or polymethyl methacrylate (PMMA).

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
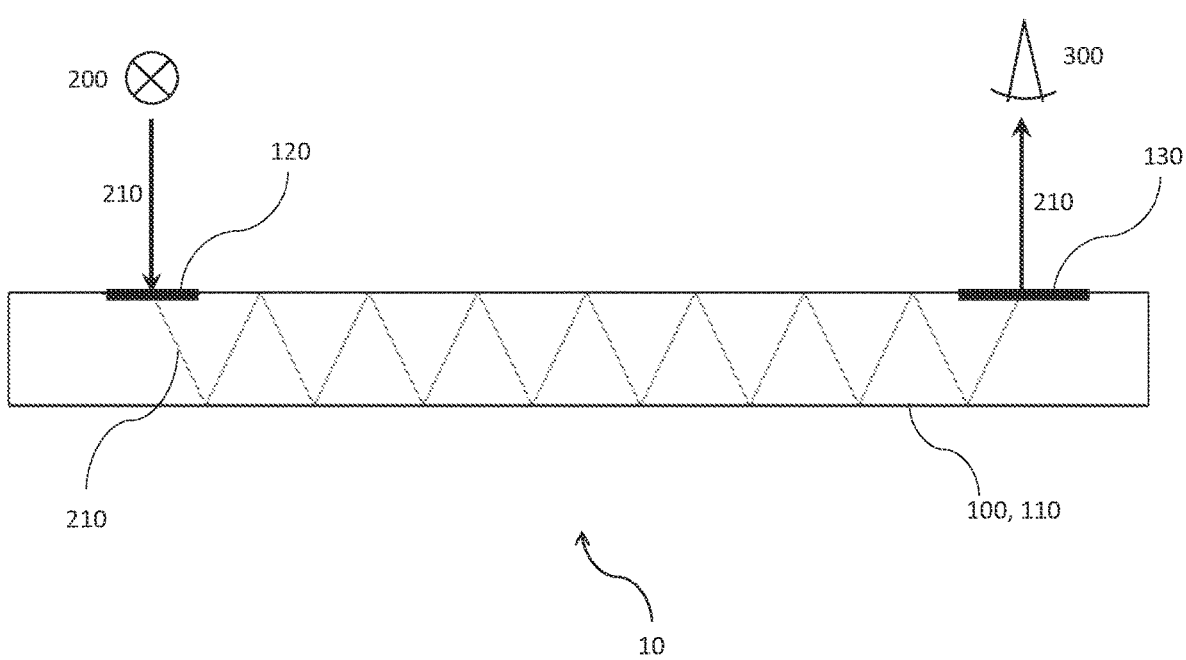
FIGS. 1 and 2 show augmented or mixed reality devices near to a human eye.
Figure 2:
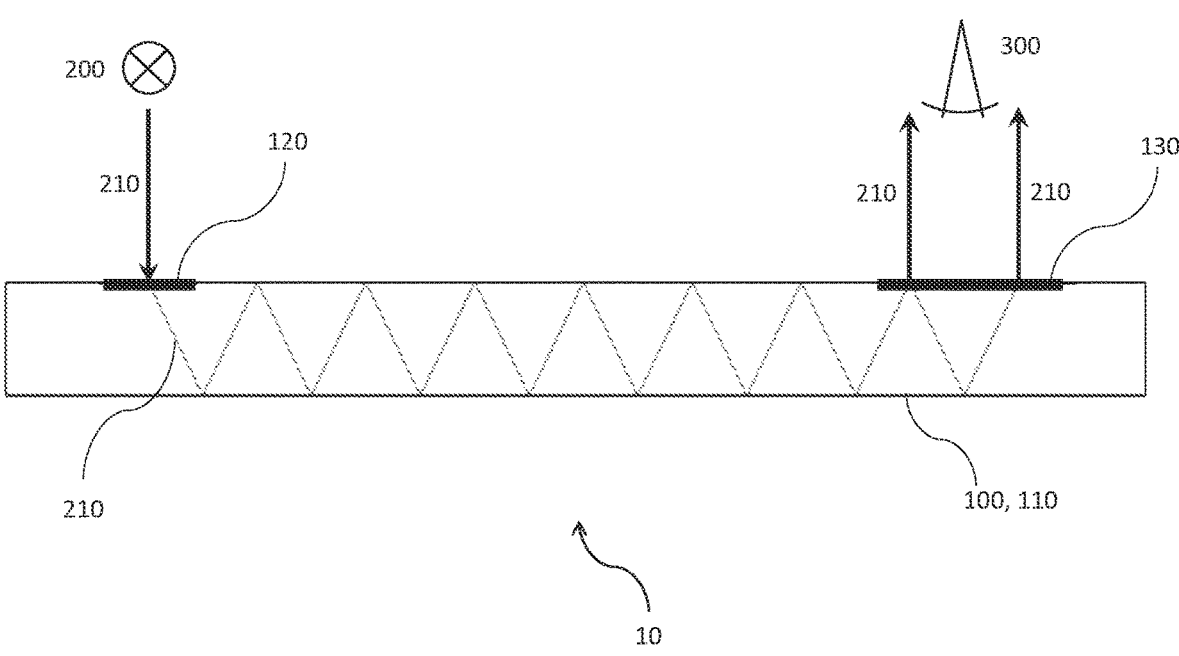

FIGS. 1, 2 show embodiments of a near-eye display 10 with a waveguide 100 including a solid body 110 consisting of glass and an image light source 200 for delivery of image pixel light 210. The image pixel light 210 corresponds to a visual image, and the visual image and/or corresponding light intensity ($I_{in}$) is coupled into the waveguide 100 at an in-coupling surface 120. The image pixel light 210 is then guided through the solid body 110 or waveguide 100 by total reflection to an out-coupling surface 130 at which the light 210 and/or corresponding visual image is coupled out to be received by a human eye 300. The out-coupled light intensity ($I_{out}$) may be smaller than the in-coupled light intensity, $I_{in} \gg I_{out}$.

The out-coupling surface 130 may be larger than the in-coupling surface 120 as best seen in FIG. 2. Often, the in-coupling surface 120 may be spatially rather small. The waveguide 100 may thus be heated by partial absorption of light intensity $I_{in}$, in particular at or near the in-coupling surface 120. To minimize thermo-optical effects impairing the quality of the visual image, the optical material of the solid body 110 has an absorption coefficient $\kappa_{460nm}$ for light having a wavelength of 460 nm, a thermal conductivity k, a coefficient of thermal expansion $\alpha_{20° C.}$ at a temperature of 20° C., a refractive index $n_F$ related to the hydrogen F-line, and a derivative $dn_F/dT_{20° C.}$, wherein $\kappa_{460nm}$, k, $\alpha_{20° C.}$, $n_F$, and $dn_F/dT_{20° C.}$ are related in such a way that a thermally induced change of an optical path length within the waveguide due to absorption of heat and/or optical radiation is quantitatively described by a merit function.

Figure 3:
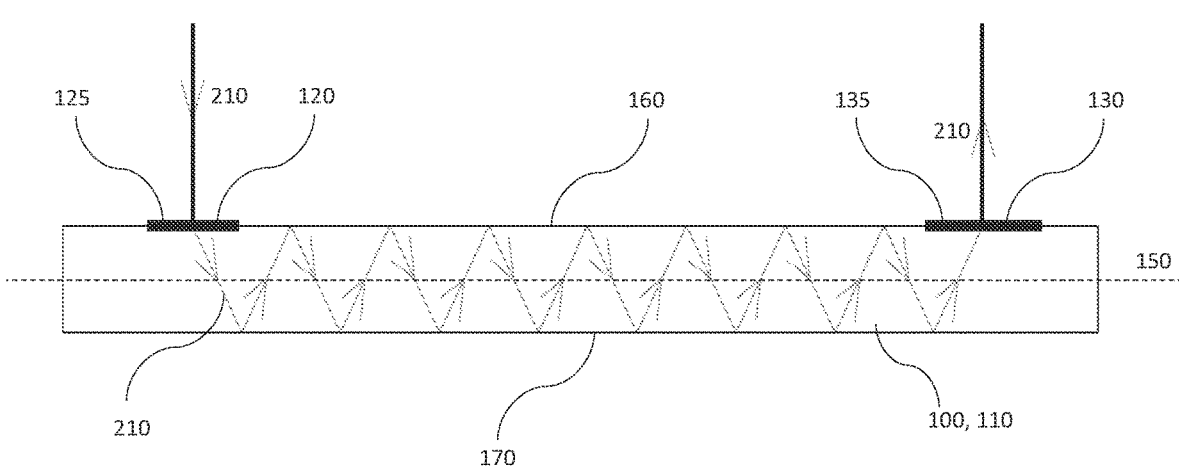
FIGS. 3 and 4 show waveguides for guiding image pixel light along a longitudinal axis of the waveguide.
Figure 4:
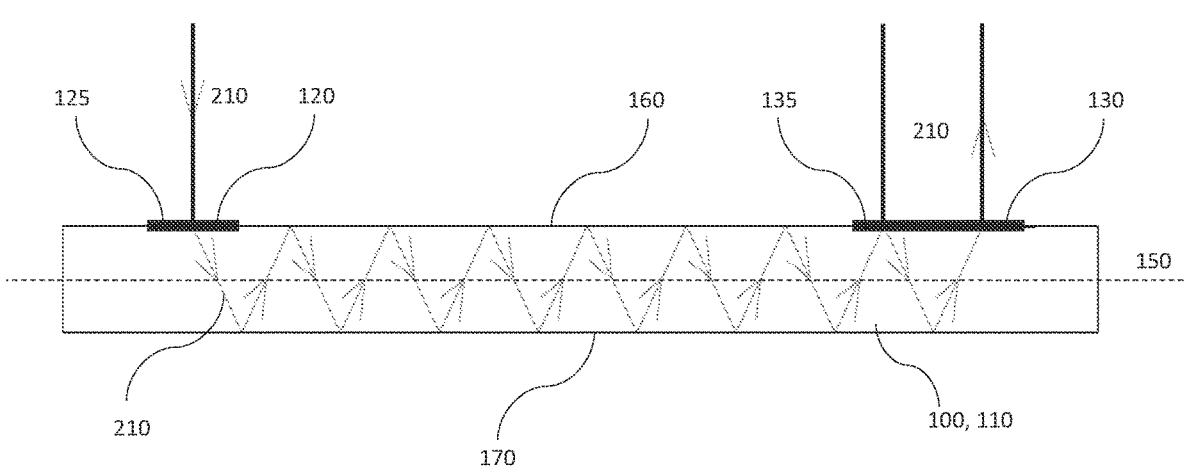

FIGS. 3, 4 show embodiments of a waveguide 100 for guiding image pixel light 210 in greater detail. The waveguide defines a longitudinal axis 150 and includes a solid body 110 consisting of glass having two opposing surfaces 160, 170 oriented parallel to the longitudinal axis 150. The two opposing surfaces 160, 170 optionally are parallel to each other and are configured to guide the image pixel light 210 along the longitudinal axis 150 of the solid body 110 by internal total reflection.

In this case, the in-coupling surface 120 is located on the upper surfaces 160 and the out-coupling surface 130 is also located on the upper surfaces 160. However, in other embodiments, the in-coupling surface 120 and out-coupling surface 130 may be on opposite surfaces 160, 170. The out-coupling surface 130 may be larger than the in-coupling surface 120 as best seen in FIG. 4.

The wave guide 100 and/or solid body 110 further includes a first optical diffractive structure 125 located at the in-coupling surface 120 and/or a second optical diffractive structure 135 at the out-coupling surface 130. The optical diffractive structure 125 and/or 135 may be designed as a diffraction grating, or may include gratings, grids, prisms and the like.

The zigzag line represents the geometrical path of the light in the waveguide, wherein the geometrical path has a length s. The optical path length in the solid body is $w = n \cdot s$. Temperature increase leads to increasing of geometric length s and changing of the refractive index n, i.e. to changes ds/dT and dn/dT. The change in optical path length with temperature may be described as $dw/dT = w \cdot ((1/n)(dn/dT) + \alpha)$, where $\alpha$ is the linear coefficient of thermal expansion.

Independently of these embodiments, the solid body 110 of the waveguide 100 optionally includes glass.

In an embodiment, the refractive index nd may be equal or greater than 1.5.

A glass composition may include the following components in weight percent:
BaO 1-10
$B_2O_3$ 10-20
CaO <1
Cl <1
$K_2O$ 1-10
$Na_2O$ 10-20
$Sb_2O_3$ <1
$SiO_2$ 60-70
$TiO_2$ <1.

In an embodiment, the refractive index nd may be equal or greater than 1.7.

A glass composition may include the following components in weight percent:
$B_2O_3$ 1-10
CaO 10-20
$K_2O$ 1-10
$La_2O_3$ 1-10
$Li_2O$ 1-10
MgO 1-10
$Na_2O$ 1-10
$Nb_2O_5$ 1-10
$P_2O_5$ <1
$Sb_2O_3$ <1
$SiO_2$ 30-40
SrO 1-10
$TiO_2$ 1-10
$ZrO_2$ 1-10.

In an embodiment, the refractive index nd may be equal or greater than 1.8.

A glass composition may include the following components in weight percent:
BaO 10-20
CaO <1
$K_2O$ 1-10
$Na_2O$ 1-10
$Nb_2O_5$ 10-20
$Sb_2O_3$ <0.01
$SiO_2$ 20-30
$TiO_2$ 20-30.

In an embodiment, the refractive index nd may be equal or greater than 1.9.

A glass composition may include the following components in weight percent:
$B_2O_3$ 10-20
$La_2O_3$ 30-40
$Nb_2O_5$ 1-10
$Sb_2O_3$ <1
$SiO_2$ 1-10
$TiO_2$ 10-20
$WO_3$ 1-10
ZnO 10-20
$ZrO_2$ 1-10.

In an embodiment, the refractive index nd may be equal or greater than 2.0.

A glass composition may include the following components in weight percent:
$B_2O_3$ 1-10
$SiO_2$ 1-10
$TiO_2$ 10-20
$Y_2O_3$ 0-1
ZnO 1-10
$ZrO_2$ 1-10.

In an embodiment, the refractive index nd may be equal or greater than 2.05.

A glass composition may include the following components in weight percent:
$B_2O_3$ 2-10
$Gd_2O_3$ 5-11
$La_2O_3$ 40-55
$Nb_2O_5$ 6-14
$SiO_2$ 2-10
$TiO_2$ 8-20
$ZrO_2$ 5-11.

In an embodiment, the refractive index nd may be equal or greater than 2.1.

A glass composition may include the following components in weight percent:
$Al_2O_3$ 0-3
$As_2O_3$ 0-2
BaO 0.5-12
$B_2O_3$ 0-10
CaO 0-3
Cl 0-0.5
$Gd_2O_3$ 1-15
$K_2O$ 0-2
$La_2O_3$ 25-45
$Nb_2O_5$ 1-20
$SO_3$ 0-0.5
$SiO_2$ 0.1-10
SrO 0-3
$Ta_2O_5$ 0-3
$TiO_2$ 20-40
$WO_3$ 0-6
$Y_2O_3$ 0-5
ZnO 0-3
$ZrO_2$ 1-11.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A waveguide for guiding an image pixel light, the waveguide comprising:
a solid body including an optical material which is transparent for at least a light with a wavelength of 460 nm;
an in-coupling surface located on the solid body and configured for coupling the image pixel light into the solid body; and
an out-coupling surface located on the solid body and configured for coupling the image pixel light out again from the solid body,
the optical material having an absorption coefficient $\kappa_{460nm}$ for a light having a wavelength of 460 nm, a thermal conductivity k, a coefficient of thermal expansion $\alpha_{20° C.}$ at a temperature of 20° C., a refractive index $n_F$ related to a hydrogen F-line, and a derivative $dn_F/dT_{20° C.}$, and
the absorption coefficient $\kappa_{460nm}$, the thermal conductivity k, the coefficient of thermal expansion $\alpha_{20° C.}$, the refractive index $n_F$ related to the hydrogen F-line, and the derivative $dn_F/dT_{20° C.}$ being related in such a way that a thermally induced change of an optical path length within the waveguide due to an absorption of at least one of heat and an optical radiation is quantitatively described by a merit function, which is $dw/dT=w·((1/n)(dn/dT)+\alpha)$, w being the optical path length, T being a temperature of the solid body, n being a refractive index, and a being a linear coefficient of thermal expansion, dw/dT being within a predetermined range.

2. The waveguide according to claim 1, wherein at least one of: (a) the solid body defines a longitudinal axis; and (b) the solid body defines a longitudinal axis and includes two opposing surfaces, the two opposing surfaces being configured for guiding the image pixel light along the longitudinal axis of the solid body by a total reflection.

3. The waveguide according to claim 2, further comprising at least one of:
(a) a first optical diffractive structure being configured to redirect the image pixel light; and
(b) a second optical diffractive structure which is configured to redirect the image pixel light.

4. The waveguide according to claim 3, wherein the optical material has a refractive index $n_d$ related to a helium d-line, and wherein the refractive index $n_d$ related to a helium d-line is greater than 1.5, wherein the waveguide is configured for an augmented reality or mixed reality device, which is a near-eye display.

5. The waveguide according to claim 1, wherein the optical material defines a thermo-optical function $F_{TO}=(\kappa_{460nm}/k)((1/n_F)(dn_F/dT_{20° C.})+\alpha_{20° C.})$.

6. The waveguide according to claim 1, wherein at least one of: (a) the absorption coefficient $\kappa_{460nm}$ is in a range of 0.01/m to 10/m; and (b) the absorption coefficient $\kappa_{460nm}$ is less than 10/m.

7. The waveguide according to claim 1, wherein the thermal conductivity k is in a range of 0.5W/(m·K) to 1.5W/(m·K).

8. The waveguide according to claim 1, wherein the coefficient of thermal expansion $\alpha_{20° C.}$ is in a range of 0.5·10-6/K to 15·10-6/K.

9. The waveguide according to claim 1, wherein the derivative $dn_F/dT_{20° C.}$ is in a range of −1·10-6/K to +9·10-6/K.

10. The waveguide according to claim 1, wherein at least one of: (a) the optical material is optically isotropic; and (b) the optical material is selected from a group consisting of glass, polymer, optoceramics, and crystalline material.

11. A device, which forms an augmented or mixed reality device, the device comprising:
a waveguide of the device, the waveguide being configured for guiding an image pixel light, the waveguide including:
a solid body including an optical material which is transparent for at least a light with a wavelength of 460 nm;
an in-coupling surface located on the solid body and configured for coupling the image pixel light into the solid body; and
an out-coupling surface located on the solid body and configured for coupling the image pixel light out again from the solid body,
the optical material having an absorption coefficient $\kappa_{460nm}$ for a light having a wavelength of 460 nm, a thermal conductivity k, a coefficient of thermal expansion $\alpha_{20° C.}$ at a temperature of 20° C., a refractive index $n_F$ related to a hydrogen F-line, and a derivative $dn_F/dT_{20° C.}$, and
the absorption coefficient $\kappa_{460 nm}$, the thermal conductivity k, the coefficient of thermal expansion $\alpha_{20° C.}$, the refractive index $n_F$ related to the hydrogen F-line, and the derivative $dn_F/dT_{20° C.}$ being related in such a way that a thermally induced change of an optical path length within the waveguide due to an absorption of at least one of heat and an optical radiation is quantitatively described by a merit function, which is $dw/dT=w·((1/n)(dn/dT)+\alpha)$, w being the optical path length, T being a temperature of the solid body, n being a refractive index, and a being a linear coefficient of thermal expansion, dw/dT being within a predetermined range.

12. The device according to claim 11, wherein during delivery of the image pixel light which is coupled into the waveguide, a temperature gradient |grad T| is obtained in the solid body, wherein the temperature gradient |grad T| is in a range of 1 K/cm to 10 K/cm, wherein the device is a near-eye display.

13. An optical material, comprising:
the optical material, which has an absorption coefficient $\kappa_{460 nm}$ for a light having a wavelength of 460 nm, a thermal conductivity k, a coefficient of thermal expansion $\alpha_{20 ° C.}$ at a temperature of 20° C., a refractive index $n_F$ related to a sodium F-line, and a derivative $dn_F/dT_{20° C.}$,
the absorption coefficient $\kappa_{460 nm}$, the thermal conductivity k, the coefficient of thermal expansion $\alpha_{20° C.}$, the refractive index $n_F$ related to the sodium F-line, and the derivative $dn_F/dT_{20° C.}$ being related in such a way that a thermally induced change of an optical path length within the waveguide due to absorption of at least one of heat and an optical radiation is quantitatively described by a merit function, which is $dw/dT = w \cdot ((1/n)(dn/dT) + \alpha)$, w being the optical path length, T being a temperature of a solid body including the optical material, n being a refractive index, and $\alpha$ being a linear coefficient of thermal expansion, $dw/dT$ being within a predetermined range.

14. The optical material according to claim 13, wherein the optical material has a refractive index $n_d$ na related to a helium d-line, and wherein the refractive index $n_d$ related to the helium d-line is greater than 1.5, wherein the optical device is configured for a waveguide or an augmented or mixed reality device.

15. The optical material according to claim 13, wherein the optical material defines a thermo-optical function $F_{TO} = (\kappa_{460\ mm}/k)(1/n_F)(dn_F/dT_{20° C.} + \alpha_{20° C.})$.

16. The optical material according to claim 13, wherein at least one of: (a) the absorption coefficient $\kappa_{460\ nm}$ is in a range of 0.01/m to 10/m; and (b) the absorption coefficient $\kappa_{460\ nm}$ is less than 10/m.

17. The optical material according to claim 13, wherein the thermal conductivity k is in a range of 0.5W/(m·K) to 1.5W/(m·K).

18. The optical material according to claim 13, wherein the coefficient of thermal expansion $\alpha_{20° C.}$ is in a range of 0.5·10-6/K to 15·10-6/K.

19. The optical material according to claim 13, wherein the derivative $dn_F/dT_{20° C.}$ is in a range of −1·10-6/K to +9·10-6/K.

20. The optical material according to claim 13, wherein at least one of: (a) the optical material is optically isotropic; and (b) the optical material is selected from a group consisting of glass, polymer, optoceramics, and crystalline material.

* * * * *